(12) United States Patent
Valkaitis

(10) Patent No.: US 11,621,848 B1
(45) Date of Patent: Apr. 4, 2023

(54) STATELESS SYSTEM TO PROTECT DATA

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/832,666

(22) Filed: Jun. 5, 2022

Related U.S. Application Data

(63) Continuation of application No. 17/832,630, filed on Jun. 4, 2022, now Pat. No. 11,528,130.

(51) Int. Cl.
| | |
|---|---|
| *G06F 21/00* | (2013.01) |
| *H04L 29/06* | (2006.01) |
| *H04L 9/32* | (2006.01) |
| *H04L 9/08* | (2006.01) |
| *H04L 9/06* | (2006.01) |

(52) U.S. Cl.
CPC .............. *H04L 9/3231* (2013.01); *H04L 9/06* (2013.01); *H04L 9/0822* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 2012/0144198 A1* | 6/2012 | Har ........................ | H04L 9/14 713/170 |
| 2016/0344561 A1* | 11/2016 | Grajek .................. | H04L 63/06 |
| 2020/0021448 A1* | 1/2020 | Chumbley ............ | H04L 9/0894 |
| 2021/0258308 A1* | 8/2021 | Avetisov ............... | H04L 9/3234 |

* cited by examiner

*Primary Examiner* — Lisa C Lewis
(74) *Attorney, Agent, or Firm* — The Pattani Law Group

(57) ABSTRACT

A method including determining, by a processor, an assigned key pair associated with a user device, the assigned key pair including an assigned public key and an assigned private key; authenticating, by the processor, received biometric information; selectively transmitting, by the processor to a trusted device based at least in part on a result of authenticating the received biometric information, an encryption request to encrypt the assigned private key; and encrypting, by the processor based at least in part on selectively transmitting the encryption request, content based at least in part on utilizing the assigned public key is disclosed. Various other aspects are contemplated.

20 Claims, 6 Drawing Sheets

STATELESS SYSTEM TO PROTECT DATA

CROSS REFERENCE

This application is a continuation of U.S. Non-Provisional patent application Ser. No. 17/832,630, filed on Jun. 4, 2022, and titled "Stateless System To Protect Data," the entire contents of which are incorporated herein by reference.

FIELD OF DISCLOSURE

Aspects of the present disclosure generally relate to use of computer hardware and/or software to manage data, and in particular to providing a stateless system to protect data.

BACKGROUND

Various methods of cryptography (e.g., encrypting and decrypting data) are known. Encryption may be associated with changing the data from being in a transparently readable format to being in an unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including determining, by a processor, an assigned key pair associated with a user device, the assigned key pair including an assigned public key and an assigned private key; authenticating, by the processor, received biometric information; selectively transmitting, by the processor to a trusted device based at least in part on a result of authenticating the received biometric information, an encryption request to encrypt the assigned private key; and encrypting, by the processor based at least in part on selectively transmitting the encryption request, content based at least in part on utilizing the assigned public key.

In another aspect, the present disclosure contemplates a device comprising a memory and a processor communicatively coupled to the memory, the processor being configured to: determine an assigned key pair associated with a user device, the assigned key pair including an assigned public key and an assigned private key; authenticate received biometric information; selectively transmit, to a trusted device based at least in part on a result of authenticating the received biometric information, an encryption request to encrypt the assigned private key; and encrypt, based at least in part on selectively transmitting the encryption request, content based at least in part on utilizing the assigned public key.

In another aspect, the present disclosure contemplates a non-transitory computer readable medium storing instructions, which when executed by a processor cause the processor to: determine an assigned key pair associated with a user device, the assigned key pair including an assigned public key and an assigned private key; authenticate received biometric information; selectively transmit, to a trusted device based at least in part on a result of authenticating the received biometric information, an encryption request to encrypt the assigned private key; and encrypt, based at least in part on selectively transmitting the encryption request, content based at least in part on utilizing the assigned public key.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
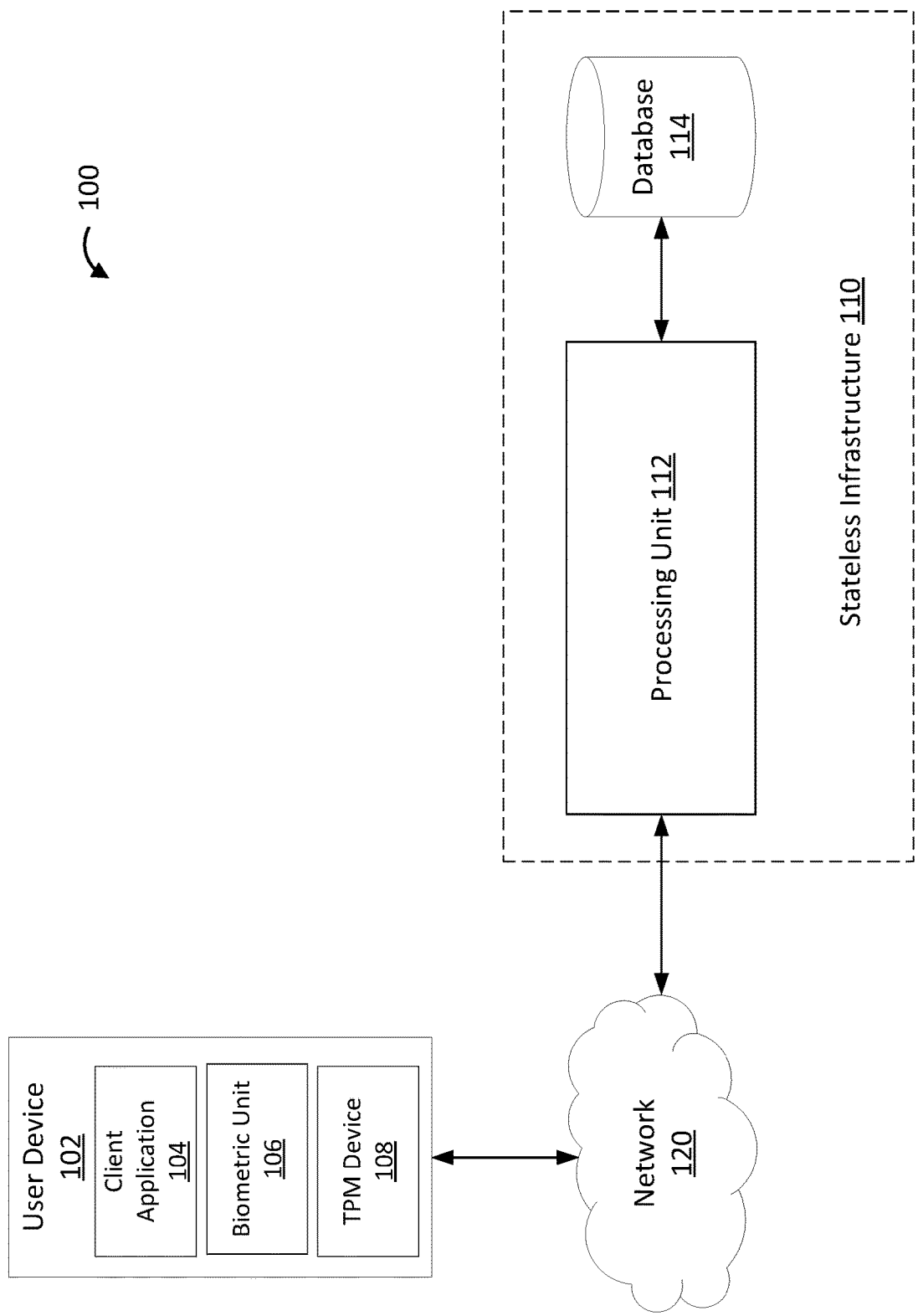

FIG. 1 is an illustration of an example system associated with a stateless system to protect data, according to various aspects of the present disclosure.

Figure 2:
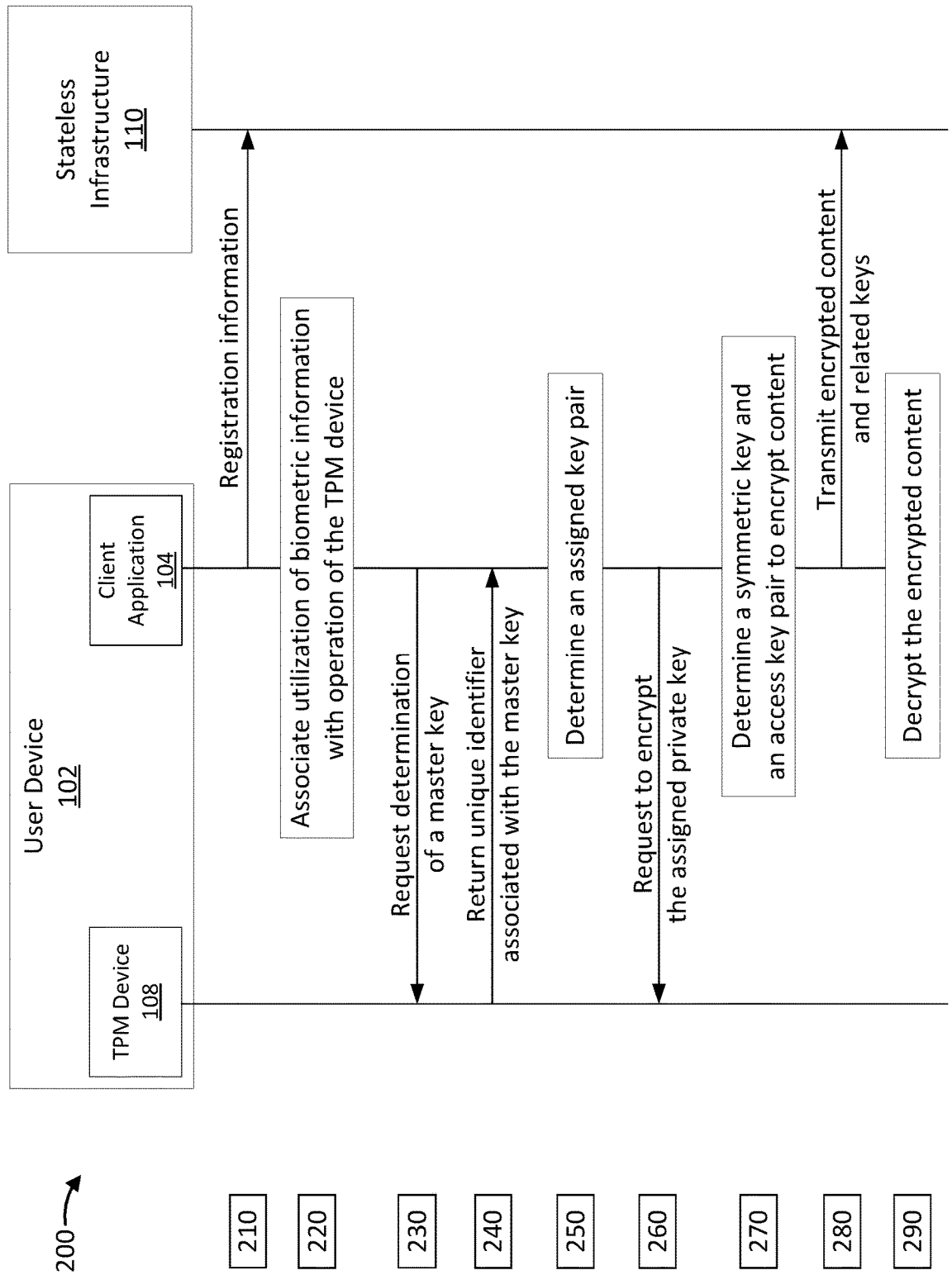

FIG. 2 is an illustration of an example flow associated with a stateless system to protect data, according to various aspects of the present disclosure.

Figure 3:
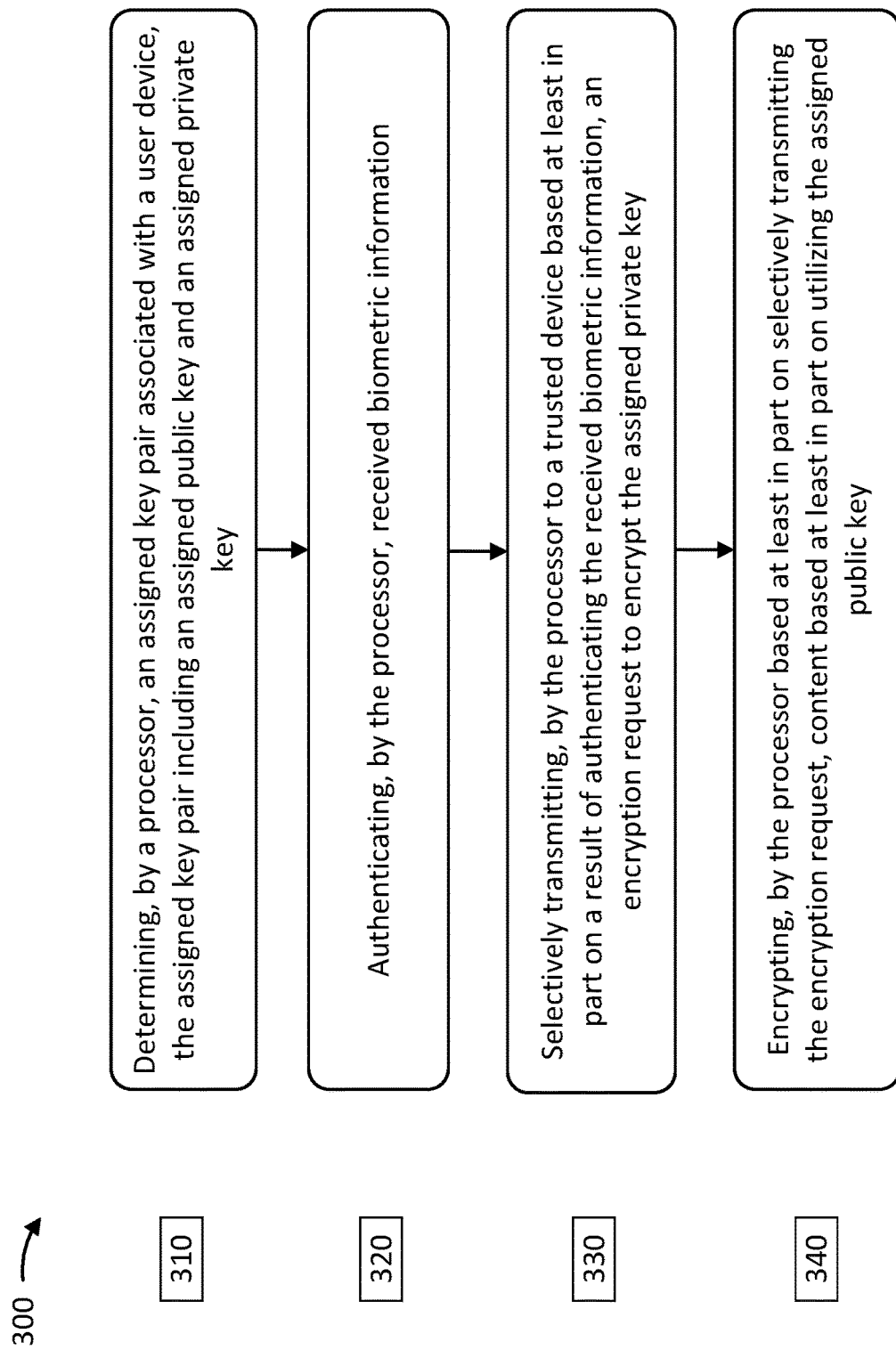

FIG. 3 is an illustration of an example process associated with a stateless system to protect data, according to various aspects of the present disclosure.

Figure 4:
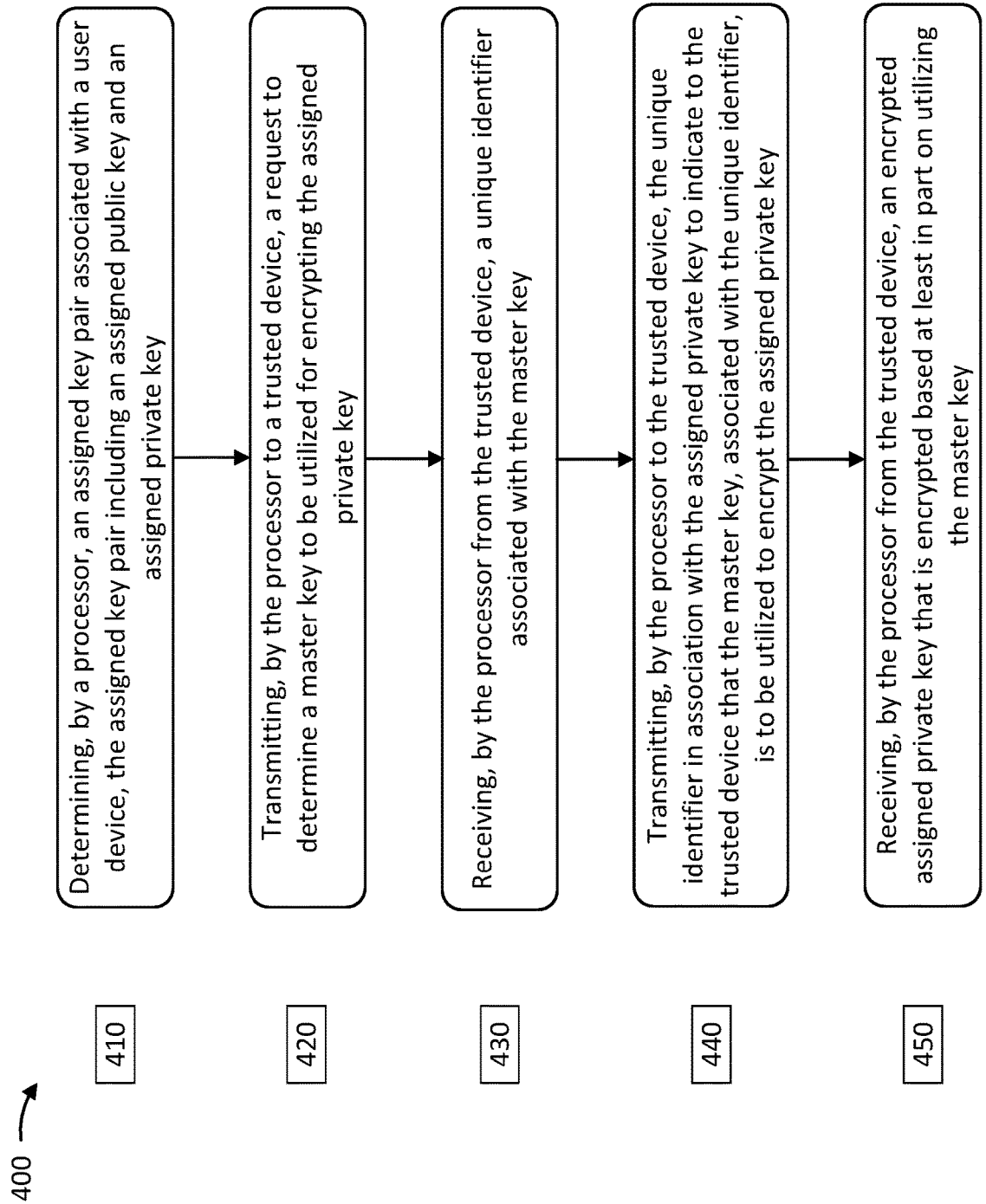

FIG. 4 is an illustration of an example process associated with a stateless system to protect data, according to various aspects of the present disclosure.

Figure 5:
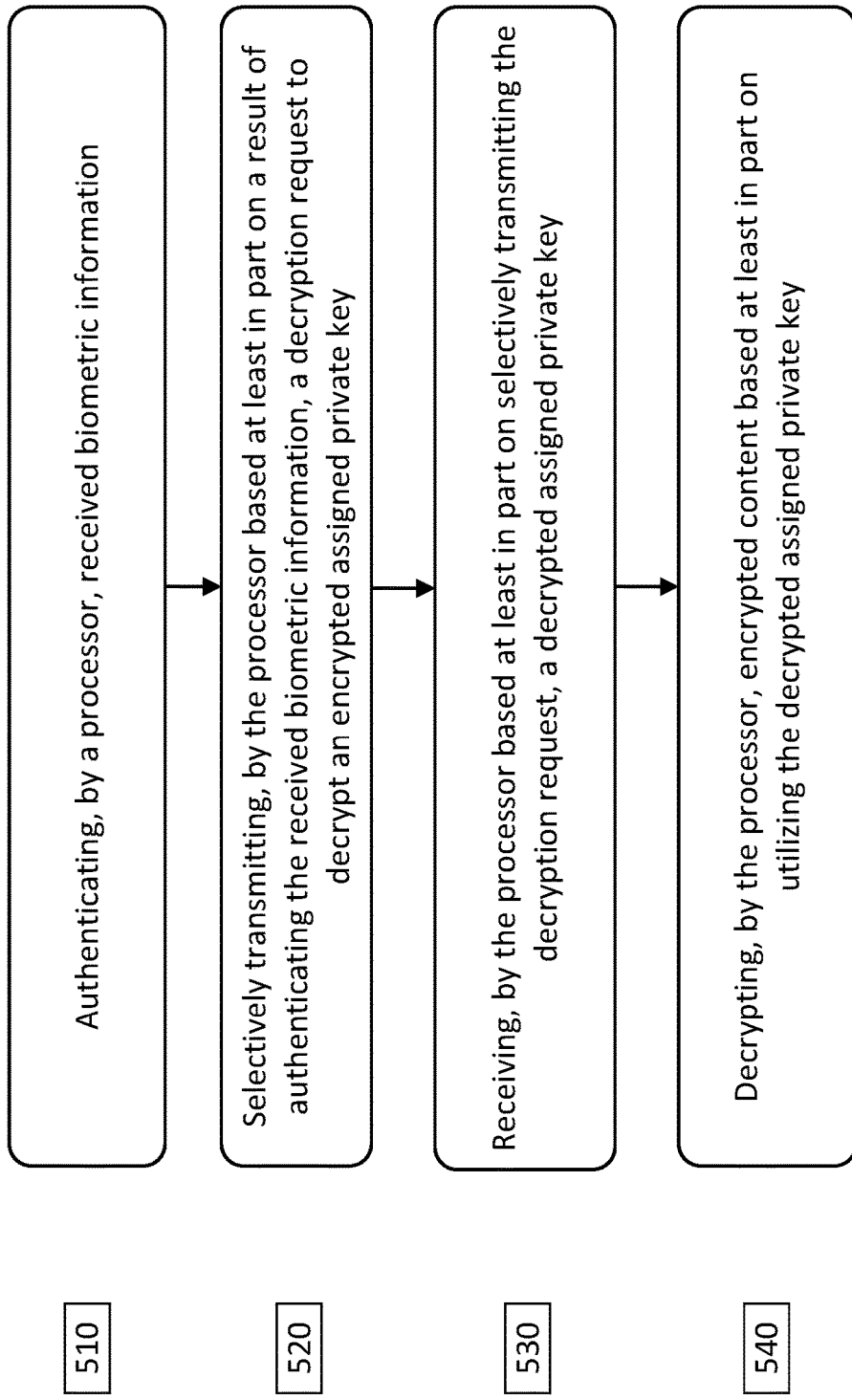

FIG. 5 is an illustration of an example process associated with a stateless system to protect data, according to various aspects of the present disclosure.

Figure 6:
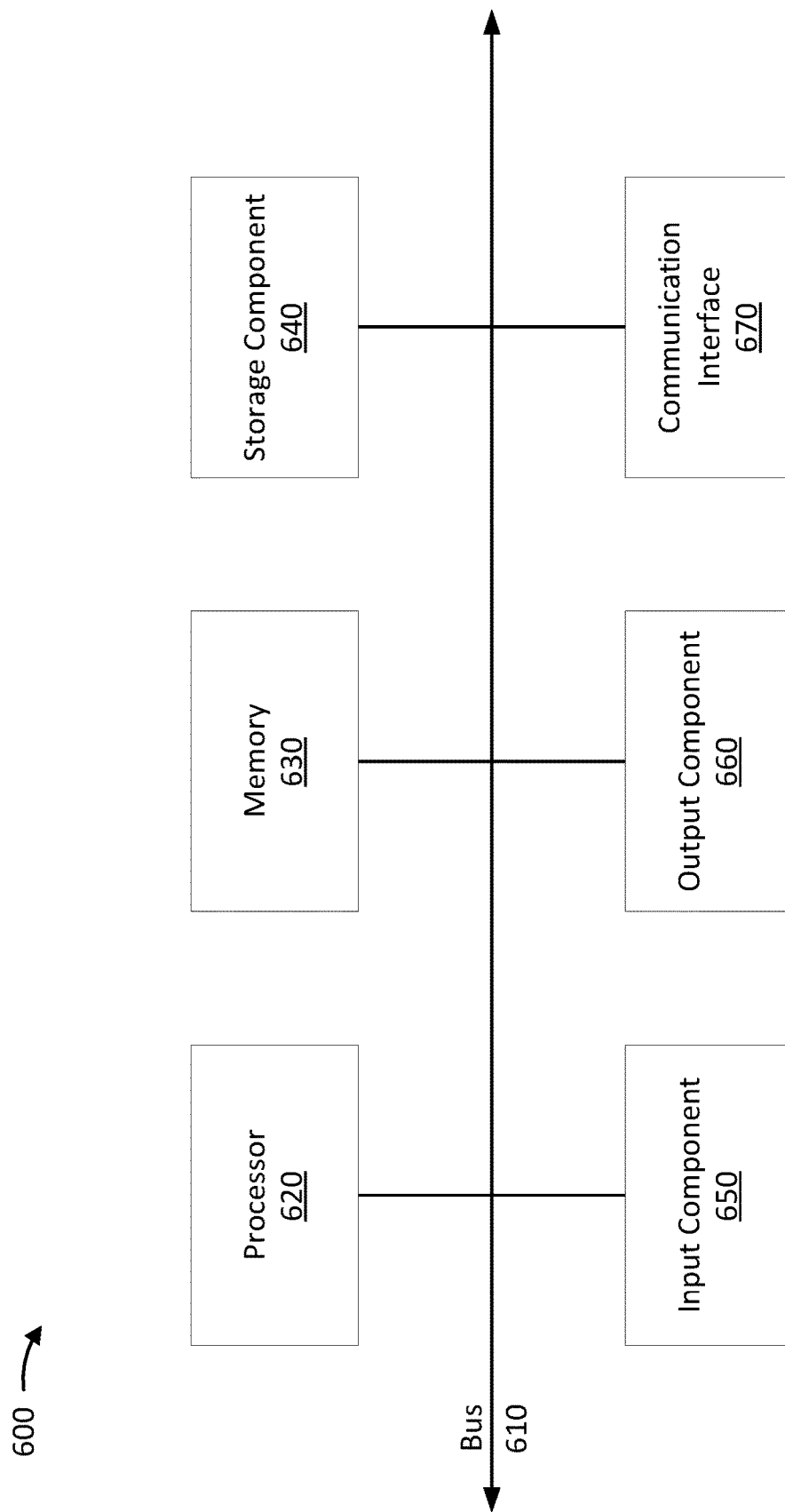

FIG. 6 is an illustration of example devices associated with a stateless system to protect data, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with a stateless system to protect data, according to various aspects of the present disclosure. The system 100 includes a user device 102 communicating with a stateless infrastructure 110 over a network 120. In some aspects, the user device 102 and the stateless infrastructure 110 may communicate with one another for purposes of obtaining and/or providing data storage and protection services. The user device 102 may include and/or be associated with a client application 104, a biometric unit 106, and a trusted platform module (TPM) device 108 communicatively coupled to an associated processor (e.g., processor 620) and/or memory (e.g., memory 630). In some aspects, the associated processor and/or memory may be local to the user device 102. In some aspects, the associated processor and/or memory may be remote with respect to the user device 102. The stateless infrastructure 110 may include a processing unit 112 and a database (e.g., memory) 114. The stateless infrastructure 110 may provide the client application 104 for installation to enable the user device 102 to communicate with an application programming interface (API) (not shown) included in the stateless infrastructure 110 and/or for obtaining the data storage and protection services.

The user device 102 may be a physical computing device capable of hosting the client application 104 and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may provide the user device 102 with the client application 104 to be installed on the user device 102. As discussed below in further detail with respect to FIG. 2, the client application 104 may be configured to enable utilization of the biometric unit 106 and/or the TPM device 108 by (an operating system of) the user device 102 to protect data. Further, the client application 104 and/or the stateless infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

The biometric unit 106 may enable identification, authentication, and/or access control. In some aspects, the biometric unit 106 may include a biometric sensor for sensing and/or capturing biometric information associated with a user. Such biometric information may include, for example, fingerprint, palm print, finger shape, palm shape, voice, retina, iris, face image, sound, dynamic signature, blood vessel pattern, keystroke, or a combination thereof. The biometric unit 106 may utilize the associated processor to correlate the captured biometric information with user information, and to store a correlation of the biometric information with the user information in the associated memory. Further, the biometric unit 106 may enable comparison of a received biometric information with stored biometric information to verify and/or authenticate that the received biometric information is associated with the user information (e.g., belongs to the user).

The TPM device 108 may include a dedicated controller utilizing integrated cryptographic keys (e.g., master keys) and/or cryptographic algorithms to operate as a secure crypto processor. The TPM device 108 may carry out cryptographic operations, embedded in a packaging with multiple physical security measures, which give it a degree of tamper resistance. In some aspects, the TPM device 108 may refrain from communicating the cryptographic keys (e.g., master keys, etc.) and/or the cryptographic algorithms externally (e.g., external to the TPM device 108).

The stateless infrastructure 110 may include the processing unit 112 and the database 114. The processing unit 112 may include a logical component configured to perform complex operations to evaluate various factors associated with encrypting and decrypting the data. The database 114 may store various pieces of information associated with storing and protecting the data, including encrypted content and/or encrypted key information. The stateless infrastructure 110 may include or be associated with a communication interface (e.g., communication interface 670) to communicate (e.g., transmit and/or receive) data.

The network 120 may be a wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

In some aspects, the data to be stored and/or protected may include any information such as private information including, for example, bank account numbers, credit card numbers, passwords, etc. In some aspects, the data may include electronic information included in files such as, for example, photographs, documents, compact discs (CDs), digital video disks (DVDs), etc. including written, printed, and/or electronic matter that provides information and/or evidence.

As indicated above, FIG. 1 is provided as an example. Other examples may differ from what is described with regard to FIG. 1.

A user device may request data storage and protection services from a data storage service provider (DSSP). Such data storage and protection services may include cloud storage services that enable the user device to utilize, for example, the Internet to store data on remote servers and/or storage devices managed by the DSSP. The data storage services may also be referred to as cloud backup services, online data storage services, online drive storages, file hosting services, file storage services, or the like. The DSSP may attempt to protect the stored data by requiring the user device to provide credentials (e.g., username, password, one-time passwords, one-time tokens, or the like) to gain authorized access to the stored data. The data storage services may be available via use of a web interface and/or an application interface.

In some instances, the DSSP may fail to protect the stored data. In an example, requiring provision of credentials may be less reliable because such credentials may become known due to, for example, exposure to unsecure networks, exposure to unsecure websites, exposure to unknown application programs, inadvertent or unintentional leaking of information, or a combination thereof. In another example, a third party may gain unauthorized access to the stored data by, for example, hacking into the servers and/or storage devices managed by the DSSP. In yet another example, internal devices associated with the DSSP that have access to the servers and/or storage devices managed by the DSSP may gain unauthorized access to the stored data. As a result, an integrity associated with the stored data may be compromised. To regain access to the stored data and/or to protect the stored data, the user device and/or the DSSP may expend resources (e.g., management resources, memory resources, computational/processing resources, power consumption resources, system bandwidth, network resources, etc.) that may otherwise be used for more suitable tasks associated with the data storage services.

Various aspects of systems and techniques discussed in the present disclosure provide a stateless system to protect data. The stateless system may include a stateless infrastructure and/or a client application installed on a user device. In some aspects, the stateless infrastructure may provide the user device with the client application, which is configured to enable utilization of a biometric unit and/or a TPM device by (an operating system of) the user device. Further, the client application may enable the user device to encrypt and decrypt the data that the user device is to protect. In an example, the client application may enable the user device to encrypt data, to store the encrypted data, and to decrypt the encrypted data. In some aspects, the user device may encrypt the data, store the encrypted data, and decrypt the encrypted data without the stateless infrastructure having access to and/or storing unencrypted data. As a result, even if a third party gains unauthorized access to the stateless infrastructure, the unauthorized access may lead to encrypted data, which the third party may not be able to decrypt. The client application and/or the stateless infrastructure may enable utilization of the biometric unit, the TPM device, and/or a particular arrangement of keys to encrypt and decrypt the data. Such utilization of the biometric unit, the TPM device, and/or the particular arrangement of keys may be critical because it enables the client application and/or the stateless infrastructure to provide data storage and protection services (e.g., to protect stored data) without the stateless infrastructure storing unencrypted data (e.g., without the stateless infrastructure having access to unencrypted data and/or unencrypted private keys). In this way, the client application and/or the stateless infrastructure may mitigate instances of the data becoming compromised, and enable efficient and sustainable utilization of resources (e.g., management resources, memory resources, computational/processing resources, power consumption resources, system bandwidth, network resources, etc.) associated with the user device and/or the stateless infrastructure for more suitable tasks related to the data storage services.

In some aspects, a processor executing the client application may determine an assigned key pair associated with a user device, the assigned key pair including an assigned public key and an assigned private key; authenticate received biometric information; selectively transmit, to a trusted device based at least in part on a result of authenticating the received biometric information, an encryption request to encrypt the assigned private key; and encrypt, based at least in part on selectively transmitting the encryption request, content based at least in part on utilizing the assigned public key.

FIG. 2 is an illustration of an example flow 200 associated with a stateless system to protect data, according to various aspects of the present disclosure. The example flow 200 may include a user device 102 in communication with a stateless infrastructure 110 for purposes of obtaining data storage and protection services. As discussed above with respect to FIG. 1, the user device 102 may include a client application 104, a biometric unit 106, and a TPM device 108. In some aspects, the stateless infrastructure 110 may provide the client application 104 to enable the user device 102 to communicate with an application programming interface (API) and/or a processor (e.g., processing unit 112, processor 620) associated with the stateless infrastructure 110. In some aspects, the user device 102 and the stateless infrastructure may communicate over a network (e.g., network 120).

As shown by reference numeral 210, the user device 102 may register an account with the stateless infrastructure 110. In some aspects, during the registration, the user device 102 may provide registration information such as, for example, identity of an owner of the user device 102, a phone number associated with the user device 102, an email address associated with the user device 102, or a combination thereof. In some aspects, the user device 102 may set up an access system including credentials (e.g., username, password, or a combination thereof) to subsequently gain access to the registered account to communicate with the stateless infrastructure 110.

In some aspects, the stateless infrastructure 110 may provide the client application 104 to be installed on the user device 102. The client application 104 may enable the user device 102 to receive information to be processed by the client application 104 and/or by the stateless infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration), the graphical interface for receiving the information. For instance, the client application 104 may cause a screen (e.g., local screen) associated with the user device 102 to display, for example, a pop-up message to request entry of the information. The client application 104 may also enable transmission of at least a portion of the information to the stateless infrastructure 110.

Further, based at least in part on the registration of the account with the stateless infrastructure 110, the client application 104 may determine availability of the biometric unit 106 and of the TPM device 108. To determine availability of the biometric unit 106 and of the TPM device 108, the client application 104 may request and receive, from an operating system of the user device, information indicating that the biometric unit 106 and of the TPM device 108 are associated with the operating system.

Based at least in part on determining availability of the biometric unit 106 and of the TPM device 108, the client application may enable utilization of the biometric unit 106 and/or the TPM device 108 for storing and/or protecting data. In an example, as shown by reference numeral 220, the client application 104 may utilize the operating system to associate verification and/or authentication of biometric information with operation of the TPM device 108. In an example, the client application 104 may associate verification and/or authentication of biometric information with encrypting of data by the TPM device 108 and/or with decrypting of data by the TPM device 108. The associating of verification and/or authentication of biometric information with operation of the TPM device 108 may be such that a request for the TPM device 108 to encrypt data and/or decrypt data is to be accompanied by a result of verification and/or authentication of biometric information.

To associate verification and/or authentication of biometric information with operation of the TPM device 108, the client application 104 may, for example, display a pop-up message on a screen associated with the user device 102 to request biometric information from an authorized user of the user device 102. Further, the client application 104 may enable (e.g., cause) the operating system to activate the biometric unit 106 to sense the biometric information. The client application 104 may receive and store, in an associated memory, the biometric information that belongs to the authorized user as authentic biometric information.

When the client application 104 is to transmit a request for the TPM device 108 to encrypt data and/or decrypt data, the client application 104 may verify and/or authenticate biometric information in real time. In an example, to verify and/or authenticate the biometric information, the client application 104 may enable (e.g., cause) the operating system to activate the biometric unit 106 to receive biometric information in real time. Further, the client application 104 may compare the received biometric information with the authentic biometric information stored in the associated memory. When the received biometric information matches (e.g., is the same as) the stored authentic biometric information, the client application 104 may determine that the received biometric information belongs to the authorized user and may select to transmit the request for the TPM device to encrypt data and/or decrypt data. In some aspects, the client application 104 may transmit a result of the received biometric information matching the authentic biometric information (e.g., successful authentication) to the TPM device 108. Alternatively, when the received biometric information fails to match (e.g., is different from) the stored authentic biometric information, the client application 104 may determine that the received biometric information does not belong to the authorized user and may select to refrain from transmitting the request for the TPM device to encrypt data and/or decrypt data.

As shown by reference numeral 230, the client application 104 may request the TPM device 108 to determine a master key. In some aspects, the master key may be associated with encryption and decryption of keys (e.g., assigned private key) utilized to store and protect data. In some aspects, the master key may include a symmetric master key. In some aspects, the master key may include an asymmetric master key pair including a master public key and a master private key. In some aspects, only the TPM device 108 may have access to the master key (e.g., the TPM device 108 may keep the master key confidential). Based at least in part on determining the master key, as shown by reference numeral 240, the TPM device 108 may return a unique identifier associated with (e.g., that identifies) the master key to the client application 104. In some aspects, the master key and/or the unique identifier may be specific to (e.g., may be utilized by) the user device 102.

As shown by reference numeral 250, the client application 104 may also determine information based at least in part on the registration of the account with the stateless infrastructure 110. In an example, the client application 104 may determine an asymmetric assigned key pair. In some aspects, the assigned key pair may be unique to the registered account and may include an assigned public key and an assigned private key. In this way, the assigned public key and the assigned private key may be account-specific. The assigned public key and the assigned private key may be associated with each other via, for example, a mathematical function. As a result, data encrypted using the assigned public key may be decrypted by utilizing the assigned private key. In some aspects, the determined assigned key pair may be unique to and/or may it be associated with the registered account.

As shown by reference numeral 260, the client application 104 may transmit an encryption request for the TPM device 108 to encrypt the assigned private key. In some aspects, the request may include the unique identifier associated with the master key and the assigned private key. Based at least in part on the request including the unique identifier in association with the assigned private key, the client application 104 may indicate to the TPM device 108 that the master key, associated with the unique identifier, is to be utilized to encrypt the assigned private key. In other words, based at least in part on transmitting the unique identifier in association with the assigned private key, the client application 104 may enable the TPM device 108 to utilize the master key, identified by the unique identifier, to encrypt the assigned private key.

Additionally, the request may include a result of the client application 104 verifying and authenticating biometric information. In an example, the client application 104 may receive and verify/authenticate biometric information in real time (e.g., while transmitting the encryption request), as discussed elsewhere herein. When the received biometric information matches the stored authentic biometric information, the client application 104 may determine that the received biometric information belongs to the authorized user and may select to transmit the encryption request. Further, the client application 104 may include the result of the successful verification and/or authentication in the encryption request.

Based at least in part on receiving the encryption request, the TPM device 108 may encrypt the assigned private key. In an example, the TPM device 108 may determine, from the included result of the verification and/or authentication, that the received biometric information matches the stored authentic biometric information. Further, the TPM device 108 may determine that the assigned private key is to be encrypted using the master key associated with the unique identifier, as indicated by the encryption request. When the master key includes the symmetric master key, the TPM device 108 may utilize the symmetric master key to encrypt the assigned private key. When the master key includes the master public key and the master private key, the TPM device 108 may utilize the master public key to encrypt the assigned private key. In some aspects, the TPM device 108 may provide the encrypted assigned private key to the client application 104.

As shown by reference numeral 270, when the user device 102 is to encrypt data that is to be stored and/or protected, the client application 104 may determine a symmetric content key and an access key pair. In some aspects, the client application 104 may determine respective symmetric content keys and respective access key pairs for each piece of data (e.g., content) that the user device 102 is to encrypt. In this way, the symmetric content key and the access key pair may be content-specific. Examples of content may include any information including, for example, alphanumeric data such as passwords, credit card numbers, bank account numbers, etc. and/or information that is written, printed, and/or electronically included in documents and/or files such as photographs, or processing documents, CDs, DVDs, etc. In some aspects, a symmetric content key and/or an access key pair may be associated with a volume of memory such that content stored in the volume of memory may be encrypted utilizing the symmetric content key and/or the access key pair.

For given content, the client application 104 may utilize a random bit generator to determine the symmetric content key. In this case, the symmetric content key may be a random key including a sequence of unpredictable and unbiased information. Further, for the given content, the client application 104 may determine an access key pair including an access public key and an access private key. The access public key and the access private key may be associated with each other via, for example, a mathematical function. As a result, data encrypted using the access public key may be decrypted by utilizing the access private key.

The client application 104 may utilize the assigned public key, the symmetric content key, and the access key pair to encrypt the content. In an example, the client application 104 may encrypt the access private key using the assigned public key associated with the registered account and/or user device 102. The client application 104 may encrypt the symmetric content key using the access public key. The client application 104 may encrypt the content using the symmetric content key.

In some aspects, the client application 104 may enable the user device 102 to store the encrypted content. For instance, the user device 102 may store the encrypted content locally and/or remotely. In an example, the user device 102 may store the encrypted content in a local memory and/or a remote memory associated with the user device 102. In another example, the user device 102 may store the encrypted content in a data storage associated with data storage and protection services provided by the stateless infrastructure. In yet another example, the user device 102 may store the encrypted content in a hand-held memory (e.g., a USB thumb drive, flash drive, etc.).

As shown by reference numeral 280, the client application 104 may transmit, and the stateless infrastructure 110 may receive, at least a portion of the information determined by the client application 104. For instance, the client application 104 may transmit the encrypted content and related keys, which may include one or more of the assigned public key, the access public key, the encrypted access private key, and/or the encrypted symmetric content key. The stateless infrastructure 110 may store the encrypted content and the related keys in association with the registered account and/or the user device 102.

As shown by reference numeral 290, the client application 104 may decrypt the encrypted content. In an example, when the user device 102 is to decrypt the encrypted content, the user device 102 may access (e.g., login into) the registered account and request the encrypted content and the related keys from the stateless infrastructure 110. Based at least in part on receiving the request, the stateless infrastructure 110 may transmit, and the client application 104 may receive, the encrypted content and the related keys.

Further, the client application 104 may transmit a decryption request for the TPM device 108 to decrypt the encrypted assigned private key. As discussed previously (e.g., block 220), a request to decrypt the encrypted assigned private key is to be accompanied by a result of verifying and authenticating biometric information in real time. As a result, the client application 104 may enable (e.g., cause) the operating system to activate the biometric unit 106 to receive biometric information in real time (e.g., why transmitting the request to decrypt). Based at least in part on receiving the biometric information, the client application 104 may compare the received biometric information with the stored authentic biometric information stored.

When a result of the comparison indicates that the received biometric information matches (e.g., is the same as) the stored authentic biometric information, the client application 104 may determine that the received biometric information belongs to the authorized user. In this case, the client application 104 may select to transmit the decryption request, which may include the result of the successful verification and/or authentication, the encrypted assigned private key, and/or the unique identifier associated with the master key. The decryption request may include the unique identifier in association with the encrypted assigned private key to indicate to the TPM device 108 that the encrypted assigned private key is to be decrypted based at least in part on utilizing the master key that is associated with (e.g., identified by) the unique identifier. Based at least in part on the result of the accessible verification/authentication and/or the unique identifier being included in the decryption request, the TPM device 108 may utilize the master key (e.g., the symmetric master key or the private master key) associated with the unique identifier to decrypt the encrypted assigned private key. The TPM device 108 may return the decrypted assigned private key to the client application 104.

The client application 104 may utilize the decrypted assigned private key to decrypt the encrypted access private key based at least in part on an association between the assigned private key and the assigned public key. Further, the client application 104 may utilize the access private key to decrypt the symmetric content key based at least in part on an association between the access private key and the access public key. The client application 104 may utilize the symmetric content key to decrypt the content.

Alternatively, when the result of the comparison indicates that the received biometric information fails to match (e.g., is different from) the stored authentic biometric information, the client application 104 may determine that the received biometric information does not belong to the authorized user. In this case, the client application 104 may select to refrain from transmitting the decryption request. In an example, the client application 104 may decline to decrypt the content and/or may refrain from providing the result of the comparison and/or the unique identifier to the TPM device 108.

As discussed above, the client application and/or the stateless infrastructure may enable utilization of the biometric unit, the TPM device, and/or a particular arrangement of keys to store and protect data. Such utilization of the biometric unit, the TPM device, and/or the particular arrangement of keys is critical because it enables the client application and/or the stateless infrastructure to provide data storage and protection services (e.g., to protect stored data) without the stateless infrastructure storing unencrypted data (e.g., without the stateless infrastructure having access to unencrypted data and/or unencrypted private keys). In this way, the client application and/or the stateless infrastructure may mitigate instances of the data becoming compromised, and enable efficient utilization of resources (e.g., management resources, memory resources, computational/processing resources, power consumption resources, system bandwidth, network resources, etc.) associated with the user device and/or the stateless infrastructure for more suitable tasks related to the data storage services.

As indicated above, FIG. 2 is provided as an example. Other examples may differ from what is described with regard to FIG. 2.

FIG. 3 is an illustration of an example process 300 associated with a stateless system to protect data, according to various aspects of the present disclosure. In some aspects, the process 300 may be performed by a memory and/or a processor/controller (e.g., processor 620) associated with a user device (e.g., user device 102) executing a client application. As shown by reference numeral 310, process 300 may include determining, by a processor, an assigned key pair associated with a user device, the assigned key pair including an assigned public key and an assigned private key. For instance, the user device may utilize the associated processor/controller to determine an assigned key pair associated with a user device, the assigned key pair including an assigned public key and an assigned private key, as discussed elsewhere herein.

As shown by reference numeral 320, process 300 may include authenticating, by the processor, received biometric information. For instance, the user device may utilize the associated processor/controller to determine, for content to be encrypted, an access key pair including an access public key and an associated access private key, as discussed elsewhere herein.

As shown by reference numeral 330, process 300 may include selectively transmitting, by the processor to a trusted device based at least in part on a result of authenticating the received biometric information, an encryption request to encrypt the assigned private key. For instance, the user device may utilize the associated processor/controller to selectively transmit, to a trusted device based at least in part on a result of authenticating the received biometric information, an encryption request to encrypt the assigned private key, as discussed elsewhere herein.

As shown by reference numeral 340, process 300 may include encrypting, by the processor based at least in part on selectively transmitting the encryption request, content based at least in part on utilizing the assigned public key. For instance, the user device may utilize the associated processor/controller to encrypt, based at least in part on selectively transmitting the encryption request, content based at least in part on utilizing the assigned public key, as discussed elsewhere herein.

Process 300 may include additional aspects, such as any single aspect or any combination of aspects described below and/or in connection with one or more other processes described elsewhere herein.

In a first aspect, process 300 may include authenticating the received biometric information includes authenticating the received biometric information at a time associated with selectively transmitting the encryption request.

In a second aspect, alone or in combination with the first aspect, process 300 may include authenticating the received biometric information and comparing the received biometric information with stored authentic biometric information.

In a third aspect, alone or in combination with the first through second aspects, in process 300, selectively transmitting the encryption request includes selecting to transmit the encryption request when the result of authenticating the received biometric information indicates that the received biometric information matches stored authentic biometric information.

In a fourth aspect, alone or in combination with the first through third aspects, in process 300, encrypting the content includes encrypting a symmetric content key, utilized to encrypt the content, based at least in part on utilizing the assigned public key.

In a fifth aspect, alone or in combination with the first through fourth aspects, process 300 may include associating authenticating of the received biometric information with encrypting of the assigned private key by the trusted device.

In a sixth aspect, alone or in combination with the first through fifth aspects, process 300 may include requesting the trusted device to determine a master key, which is to be utilized to encrypt the assigned private key.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with a stateless system to protect data, according to various aspects of the present disclosure. In some aspects, the process 400 may be performed by a memory and/or a processor/controller (e.g., processor 620) associated with a user device (e.g., user device 102) executing a client application. As shown by reference numeral 410, process 400 may include determining, by a processor, an assigned key pair associated with a user device, the assigned key pair including an assigned public key and an assigned private key. For instance, the user device may utilize the associated memory and processor to determine an assigned key pair associated with a user device, the assigned key pair including an assigned public key and an assigned private key, as discussed elsewhere herein.

As shown by reference numeral 420, process 400 may include transmitting, by the processor to a trusted device, a request to determine a master key to be utilized for encrypting the assigned private key. For instance, the user device may utilize an associated communication interface (e.g., communication interface 670) with the associated memory and processor to transmit, to a trusted device, a request to determine a master key to be utilized for encrypting the assigned private key, as discussed elsewhere herein.

As shown by reference numeral 430, process 400 may include receiving, by the processor from the trusted device, a unique identifier associated with the master key. For instance, the user device may utilize the associated communication interface, memory, and processor to receive, from the trusted device, a unique identifier associated with the master key, as discussed elsewhere herein.

As shown by reference numeral 440, process 400 may include transmitting, by the processor to the trusted device, the unique identifier in association with the assigned private key to indicate to the trusted device that the master key, associated with the unique identifier, is to be utilized to encrypt the assigned private key. For instance, the user device and/or the stateless infrastructure may utilize the associated communication interface, memory, and processor to transmit, to the trusted device, the unique identifier in association with the assigned private key to indicate to the trusted device that the master key, associated with the unique identifier, is to be utilized to encrypt the assigned private key, as discussed elsewhere herein.

As shown by reference numeral 450, process 400 may include receiving, by the processor from the trusted device, an encrypted assigned private key that is encrypted based at least in part on utilizing the master key. For instance, the user device may utilize the associated communication interface, memory, and processor to receive, from the trusted device, an encrypted assigned private key that is encrypted based at least in part on utilizing the master key, as discussed elsewhere herein.

Process 400 may include additional aspects, such as any single aspect or any combination of aspects described below and/or in connection with one or more other processes described elsewhere herein.

In a first aspect, in process 400, transmitting the unique identifier in association with the assigned private key includes transmitting a result of comparing received biometric information with authentic biometric information to enable encryption of the assigned private key.

In a second aspect, alone or in combination with the first aspect, in process 400, the master key includes a symmetric master key to be utilized for encrypting the assigned private key.

In a third aspect, alone or in combination with the first through second aspects, in process 400, the master key includes a master public key and a master private key, the master public key to be utilized for encrypting the assigned private key.

In a fourth aspect, alone or in combination with the first through third aspects, in process 400, the master key is confidential to the trusted device.

In a fifth aspect, alone or in combination with the first through fourth aspects, process 400 may include associating, by the processor, authentication of biometric information with encryption of the assigned private key by the trusted device.

In a sixth aspect, alone or in combination with the first through fifth aspects, process 400 may include encrypting, by the processor, a symmetric content key based at least in part on utilizing the assigned public key, the symmetric content key to be utilized to encrypt content.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with a stateless system to protect data, according to various aspects of the present disclosure. In some aspects, the process 400 may be performed by a memory and/or a processor/controller (e.g., processor 620) associated with a user device (e.g., user device 102) executing a client application. As shown by reference numeral 510, process 500 may include authenticating, by a processor, received biometric information. For instance, the user device may utilize the associated processor/controller to authenticate received biometric information, as discussed elsewhere herein.

As shown by reference numeral 520, process 500 may include selectively transmitting, by the processor based at least in part on a result of authenticating the received biometric information, a decryption request to decrypt an encrypted assigned private key. For instance, the user device may utilize an associated communication interface (e.g., communication interface 670) with the associated processor/controller to selectively transmit, based at least in part on a result of authenticating the received biometric information, a decryption request to decrypt an encrypted assigned private key, as discussed elsewhere herein.

As shown by reference numeral 530, process 500 may include receiving, by the processor based at least in part on selectively transmitting the decryption request, a decrypted assigned private key. For instance, the user device may utilize the associated communication interface and processor/controller to receive, based at least in part on selectively transmitting the decryption request, a decrypted assigned private key, as discussed elsewhere herein.

As shown by reference numeral 540, process 500 may include decrypting, by the processor, encrypted content based at least in part on utilizing the decrypted assigned private key. For instance, the user device may utilize the associated processor/controller to decrypt encrypted content based at least in part on utilizing the decrypted assigned private key, as discussed elsewhere herein.

Process 500 may include additional aspects, such as any single aspect or any combination of aspects described below and/or in connection with one or more other processes described elsewhere herein.

In a first aspect, in process 500, authenticating the received biometric information includes authenticating the received biometric information at a time associated with selectively transmitting the decryption request.

In a second aspect, alone or in combination with the first aspect, in process 500, authenticating the received biometric information includes comparing the received biometric information with stored authentic biometric information.

In a third aspect, alone or in combination with the first through second aspects, in process 500, selectively transmitting the decryption request includes selecting to transmit the decryption request when the result indicates that the received biometric information matches stored authentic biometric information.

In a fourth aspect, alone or in combination with the first through third aspects, in process 500, decrypting the content includes decrypting a symmetric content key, utilized to encrypt the content, based at least in part on utilizing the decrypted assigned private key.

In a fifth aspect, alone or in combination with the first through fourth aspects, in process 500, selectively transmitting the decryption request includes selectively transmitting a unique identifier in association with the encrypted assigned private key to indicate that a master key, associated with the unique identifier, is to be utilized to decrypt the encrypted assigned private key.

In a sixth aspect, alone or in combination with the first through fifth aspects, process 500 includes associating authenticating of the received biometric information with the decrypting of the encrypted assigned private key.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600, according to various aspects of the present disclosure. In some aspects, the example devices 600 may form part of or implement the systems, environments, infrastructures, components, or the like described elsewhere herein and may be used to perform the example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a processor, an assigned key pair associated with a user device, the assigned key pair including an assigned public key and an assigned private key;
   authenticating, by the processor, received biometric information;
   selectively transmitting, by the processor to a trusted device based at least in part on a result of authenticating the received biometric information, an encryption request to encrypt the assigned private key; and
   encrypting, by the processor based at least in part on selectively transmitting the encryption request, content based at least in part on utilizing the assigned public key.

2. The method of claim 1, wherein authenticating the received biometric information includes authenticating the received biometric information at a time associated with selectively transmitting the encryption request.

3. The method of claim 1, wherein authenticating the received biometric information includes comparing the received biometric information with stored authentic biometric information.

4. The method of claim 1, wherein selectively transmitting the encryption request includes selecting to transmit the encryption request when the result of authenticating the received biometric information indicates that the received biometric information matches stored authentic biometric information.

5. The method of claim 1, wherein encrypting the content includes encrypting a symmetric content key, utilized to encrypt the content, based at least in part on utilizing the assigned public key.

6. The method of claim 1, further comprising:
   associating authenticating of the received biometric information with encrypting of the assigned private key by the trusted device.

7. The method of claim 1, further comprising:
   requesting the trusted device to determine a master key, which is to be utilized to encrypt the assigned private key.

8. A user device, comprising:
   a memory; and
   a processor communicatively coupled to the memory, the memory and the processor being configured to:
      determine an assigned key pair associated with a user device, the assigned key pair including an assigned public key and an assigned private key;
      authenticate received biometric information;
      selectively transmit, to a trusted device based at least in part on a result of authenticating the received biometric information, an encryption request to encrypt the assigned private key; and
      encrypt, based at least in part on selectively transmitting the encryption request, content based at least in part on utilizing the assigned public key.

9. The user device of claim 8, wherein, to authenticate the received biometric information, the memory and the processor are configured to authenticate the received biometric information at a time associated with selectively transmitting the encryption request.

10. The user device of claim 8, wherein, to authenticate the received biometric information, the memory and the processor are configured to compare the received biometric information with stored authentic biometric information.

11. The user device of claim 8, wherein, to selectively transmit the encryption request, the memory and the processor are configured to select to transmit the encryption request when the result of authenticating the received biometric information indicates that the received biometric information matches stored authentic biometric information.

12. The user device of claim 8, wherein, to encrypt the content, the memory and the processor are configured to encrypt a symmetric content key, utilized to encrypt the content, based at least in part on utilizing the assigned public key.

13. The user device of claim 8, wherein the memory and the processor are configured to associate authenticating of the received biometric information with encrypting of the assigned private key by the trusted device.

14. The user device of claim 8, wherein the memory and the processor are configured to request the trusted device to determine a master key, which is to be utilized to encrypt the assigned private key.

15. A non-transitory computer-readable medium configured to store instructions, which when executed by a processor associated with a user device, configure the processor to:
   determine an assigned key pair associated with a user device, the assigned key pair including an assigned public key and an assigned private key;
   authenticate received biometric information;
   selectively transmit, to a trusted device based at least in part on a result of authenticating the received biometric information, an encryption request to encrypt the assigned private key; and
   encrypt, based at least in part on selectively transmitting the encryption request, content based at least in part on utilizing the assigned public key.

16. The non-transitory computer-readable medium of claim 15, wherein, to authenticate the received biometric information, the processor is configured to authenticate the received biometric information at a time associated with selectively transmitting the encryption request.

17. The non-transitory computer-readable medium of claim 15, wherein, to authenticate the received biometric information, the processor is configured to compare the received biometric information with stored authentic biometric information.

18. The non-transitory computer-readable medium of claim 15, wherein, to selectively transmit the encryption request, the processor is configured to select to transmit the encryption request when the result of authenticating the received biometric information indicates that the received biometric information matches stored authentic biometric information.

19. The non-transitory computer-readable medium of claim 15, wherein, to encrypt the content, the processor is configured to encrypt a symmetric content key, utilized to encrypt the content, based at least in part on utilizing the assigned public key.

20. The non-transitory computer-readable medium of claim 15, wherein the processor is configured to associate authenticating of the received biometric information with encrypting of the assigned private key by the trusted device.

* * * * *